(12) United States Patent
Haraikawa

(10) Patent No.: US 12,504,846 B2
(45) Date of Patent: Dec. 23, 2025

(54) POSITION DETECTION DEVICE WITH NOTIFICATION OF INTERRUPT FAILURE UPON PRESSING ABUTTON

(71) Applicant: ALPS ALPINE CO., LTD., Tokyo (JP)

(72) Inventor: Yuki Haraikawa, Fukushima (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 18/908,013

(22) Filed: Oct. 7, 2024

(65) Prior Publication Data

US 2025/0123705 A1 Apr. 17, 2025

(30) Foreign Application Priority Data

Oct. 16, 2023 (JP) .................................. 2023-177954

(51) Int. Cl.
*G06F 3/041* (2006.01)

(52) U.S. Cl.
CPC .............................. *G06F 3/04166* (2019.05)

(58) Field of Classification Search
CPC ...... G06F 3/038; G06F 3/0412; G06F 3/0416; G06F 3/04166; G06F 3/0418
See application file for complete search history.

(56) References Cited

U.S. PATENT DOCUMENTS

| | | | |
|---|---|---|---|
| 2011/0227870 A1* | 9/2011 | Kim ..................... | G06F 3/0416 345/174 |
| 2014/0145985 A1* | 5/2014 | Akai .................. | G06F 3/04166 345/173 |
| 2017/0090648 A1* | 3/2017 | Yatsu ..................... | G06F 3/045 |
| 2017/0169537 A1* | 6/2017 | Nemiroff .............. | G06F 3/0416 |
| 2020/0319748 A1* | 10/2020 | Fleck .................. | G06F 13/4282 |
| 2021/0056286 A1 | 2/2021 | Cheng | |
| 2021/0303248 A1* | 9/2021 | Nakai ................. | G06F 3/04817 |

FOREIGN PATENT DOCUMENTS

| | | |
|---|---|---|
| JP | H11-167465 | 6/1999 |
| KR | 20170051689 | 5/2017 |
| WO | 2009/131307 | 10/2009 |

OTHER PUBLICATIONS

Extended European Search Report for 24205009.4 mailed on Feb. 26, 2025.

* cited by examiner

*Primary Examiner* — Liliana Cerullo
(74) *Attorney, Agent, or Firm* — IPUSA, PLLC

(57) ABSTRACT

A position detection device includes: a touch panel disposed on a display screen of a display device; an interrupt signal outputter configured to output an interrupt signal in response to a detection of a contact of an indicator with respect to the touch panel; and a contact position specifier. The contact position specifier specifies, in a case of no displaying of a specific operation area on the display screen, a contact position of the indicator using the touch panel in response to an output of the interrupt signal, or specifies, in a case of displaying of the specific operation area on the display screen, a contact position of the indicator using the touch panel at a predetermined cycle.

2 Claims, 4 Drawing Sheets

POSITION DETECTION DEVICE WITH NOTIFICATION OF INTERRUPT FAILURE UPON PRESSING ABUTTON

CROSS-REFERENCE TO RELATED APPLICATIONS

Priority is claimed to Japanese Patent Application No. 2023-177954, filed Oct. 16, 2023, the entire content of which is incorporated herein by reference.

BACKGROUND

1. Technical Field

The present invention relates to a position detection device using a touch panel.

2. Description of Related Art

Conventionally, a pressed position detection device for a touch panel with which a contact position of a user's finger or the like is detected using the touch panel is known (see, for example, Japanese Unexamined Patent Publication No. H11-167465, hereinafter "Patent Document 1"). In this pressed position detection device, an interrupt to the CPU occurs in response to a user's pressing of a discretionarily selected position on the touch panel, and the pressed position is read in response to an instruction from the CPU.

SUMMARY

According to one embodiment, a position detection device includes: a touch panel disposed on a display screen of a display device; an interrupt signal outputter configured to output an interrupt signal in response to a detection of a contact of an indicator with respect to the touch panel; and a contact position specifier. The contact position specifier specifies, in a case of no displaying of a specific operation area on the display screen, a contact position of the indicator using the touch panel in response to an output of the interrupt signal, or specifies, in a case of displaying of the specific operation area on the display screen, a contact position of the indicator using the touch panel at a predetermined cycle.

DETAILED DESCRIPTION

Figure 1:
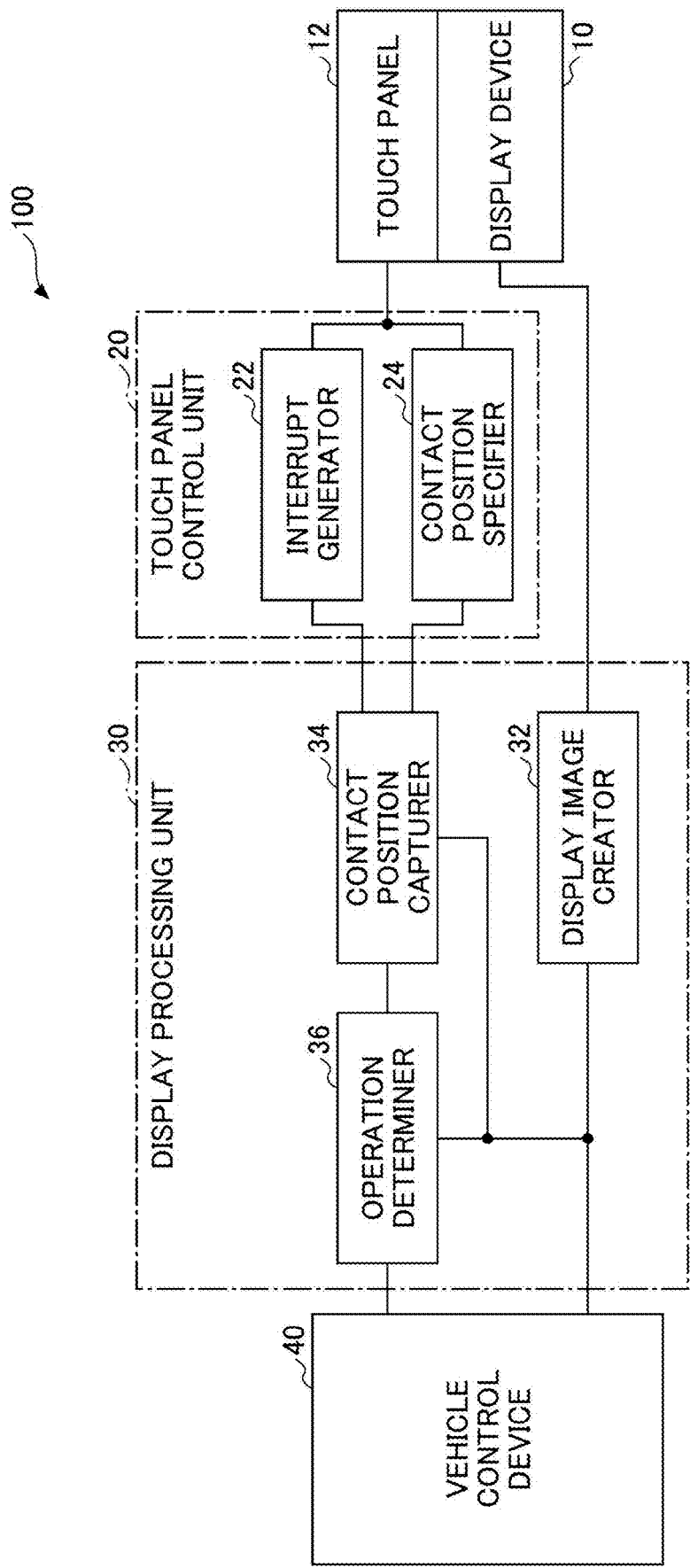
FIG. 1 is a diagram illustrating a configuration of an in-vehicle device according to an embodiment.

In recent years, vehicles are increasingly provided with a head unit having a large screen, and selection and instruction of a large number of functions are performed using a touch panel disposed on the screen of the head unit. However, when a position detection on a touch panel in such a vehicle using the pressed position detection device disclosed in Patent Document 1 is attempted, unless an interrupt normally occurs in response to pressing of the touch panel, subsequent processing of reading a pressed position is not performed and a pressed position cannot be detected.

For example, consider a case where a specific operation button that is a target of ISO26262, which is an automobile functional safety standard, is displayed on a screen and whether or not the operation button is pressed is detected using a touch panel. In the case where no interrupt to the CPU occurs in response to the user's pressing of the operation button, a predetermined process corresponding to the operation button is not started, which causes an inconvenience to the user. In particular, since it is the user pressing this button, the user cannot know that nothing is reacting to this pressing operation, and cannot take any measures against the trouble of the interrupt occurrence.

In view of the above circumstances, there is a need for a position detection device capable of detecting a pressed position regardless of whether or not an abnormality has occurred in the occurrence of an interrupt that is caused by pressing a touch panel at a specific area such as an operation button or the like.

According to an embodiment of the present invention, there is provided a position detection device including: a touch panel disposed on a display screen of a display device; an interrupt signal outputter that outputs an interrupt signal in response to a detection of a contact of an indicator with respect to the touch panel; and a contact position specifier that specifies, in a case of no displaying of a specific operation area on the display screen, the contact position of the indicator using the touch panel in response to an output of the interrupt signal, and specifies, in a case of displaying of the specific operation area on the display screen, the contact position of the indicator using the touch panel at a predetermined cycle. Since a contact position is periodically specified for a specific operation area, a contact position can be detected regardless of the presence or absence of abnormality in the interrupt generation.

In addition, it is preferable that the contact position specifier performs specifying a contact position of the indicator using the touch panel at a predetermined cycle in a case of displaying of the specific operation area on the display screen, in conjunction with specifying a contact position of the indicator using the touch panel in response to an output of an interrupt signal. Thus, in a normal state where there is no abnormality, a contact position can be detected in response to a user's bringing the indicator into contact with the specific operation area, and even in the absence of an interrupt at the time of occurrence of abnormality, the contact position of the indicator with respect to the specific operation area can be detected by the periodic detection operation.

It is preferable that the position detection device further includes an interrupt failure determiner that determines an operation failure of the interrupt signal outputter in a case of no output of an interrupt signal in response to a detection of a contact of the indicator with respect to the specific operation area through periodic specifying of a contact position by the above-described contact position specifier. It is thereby possible to confirm that an interrupt signal that should be output in response to the indicator's contact with respect to the touch panel is not output due to some abnormality.

Furthermore, it is desirable that the above-described contact position specifier specifies a contact position at a predetermined cycle in response to the interrupt failure determiner determining an operation failure determination of an interrupt signal outputter, regardless of whether or not the specific operation area is displayed. Thus, the position detection of a portion which has become undetectable due to an absence of an output of an interrupt signal can be resumed.

Hereinafter, an in-vehicle device of an embodiment to which a position detection device of the present invention is applied will be described with reference to the drawings.

FIG. 1 is a diagram illustrating a configuration of an in-vehicle device according to the embodiment. The in-vehicle device 100 illustrated in FIG. 1 includes a display device 10, a touch panel 12, a touch panel control unit 20, a display processing unit 30, and a vehicle control device 40.

The display device 10 is disposed in front of the center between a driver's seat and a passenger seat of the vehicle in which the in-vehicle device 100 is mounted, and is configured using a liquid crystal display (LCD). The touch panel 12 is disposed on a display screen of the display device 10. For example, the touch panel 12 has a detection area covering the entire display screen of the display device 10, and has two types of transparent electrode groups intersecting with each other in the detection area.

The touch panel control unit 20 detects a contact position of an indicator (for example, a fingertip of a user) on the display screen of the display device 10, using the touch panel 12. For this purpose, the touch panel control unit 20 includes an interrupt generator 22 and a contact position specifier 24.

The interrupt generator 22 outputs an interrupt signal in response to a contact of the indicator with any point in the detection area of the touch panel 12. The contact position specifier 24 specifies a contact position in response to the indicator's contact with any point in the detection area of the touch panel 12. For example, while a position detection signal is being sequentially input to each transparent electrode of either one of the transparent electrode groups included in the touch panel 12, a voltage of each transparent electrode of the other transparent electrode group is detected, and thereby an intersection position of each transparent electrode at which the capacitance changes is specified as the contact position of the indicator.

The display processing unit 30 creates an image to be displayed on the display device 10, and in the case where the image includes various operation buttons, determines whether or not the operation buttons are pressed (touched) by the indicator. For this purpose, the display processing unit 30 includes a display image creator 32, a contact position capturer 34, and an operation determiner 36.

The display image creator 32 creates a display image of an operation screen to be displayed on the display device 10 and other display images. The operation screen includes various operation buttons. The various operation buttons include a "specific operation button" corresponding to a specific operation area and "other operation buttons". The difference between these operation buttons will be described later.

The contact position capturer 34 instructs the touch panel control unit 20 of a timing of performing specifying a contact position, and acquires the contact position of the indicator obtained by the specifying operation.

The operation determiner 36 specifies an operation button corresponding to the contact position of the indicator acquired by the contact position capturer 34. Note that the operation buttons are not specified in the case where the indicator is pressing an area other than the operation buttons on the display screen (for example, a case where the indicator is pointing to an area other than the operation buttons on the operation screen being displayed, a case where a screen not including the operation buttons is displayed, or the like).

The vehicle control device 40 controls each part of the vehicle and provides the display processing unit 30 with image information to be displayed and, in the case where the image information is related to an operation screen, the position and type of an operation button (information indicating whether the operation button is a specific operation button or another operation button).

The interrupt generator 22 corresponds to an interrupt signal outputter, and the contact position specifier 24 and the contact position capturer 34 correspond to a contact position specifier.

The in-vehicle device 100 of the present embodiment has the above-described configuration for example. The in-vehicle device 100 may include a memory and a computer coupled thereto. A selection operation of an operation button using the touch panel 12 will be described hereinafter.

As described above, two types of operation buttons ("specific operation button" and "other operation buttons") are assumed in the present embodiment. The "other operation buttons" are buttons for detecting a contact position after waiting for an interrupt signal that is output from the interrupt generator 22 in response to the user's contacting of any point in the detection area of the touch panel 12 with the indicator. In contrast, the "specific operation button" is for periodically detecting the contact position (at a predetermined period), although the "specific operation button" is the same as the "other operation buttons" in that the detection of the contact position is performed in response to an output of the interrupt signal. The "specific operation button" is assumed to be an operation button for selecting a function that is a target of ISO 26262, which is an automobile functional safety standard; however, any operation button that a user, a product developer, or the like considers as important may be included in the "specific operation button".

In the case where the "specific operation button" is included in the operation screen being displayed (both the "specific operation button" and the "other operation button" may be included), the contact position capturer 34 periodically transmits an instruction to the contact position specifier 24 at the timing when an interrupt signal is output, and acquires a contact position transmitted in response to the instruction.

In the case where the "specific operation button" is not included in the operation screen being displayed, the contact position capturer 34 transmits an instruction to the contact position specifier 24 at the timing when an interrupt signal is output, and acquires a contact position transmitted in response to the instruction.

Figure 2:
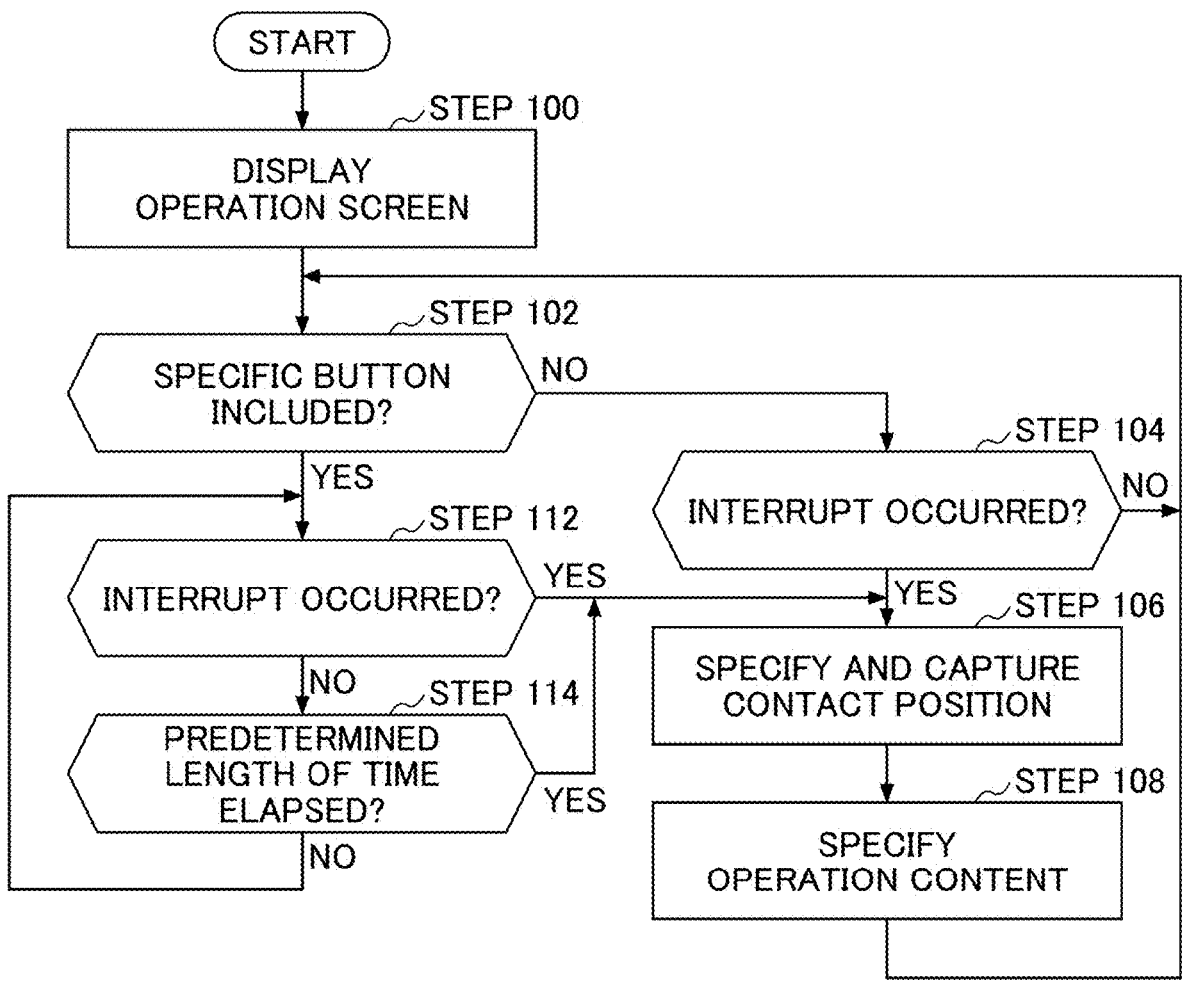
FIG. 2 is a flowchart illustrating an operation procedure of displaying an operation screen and selecting an operation button included therein.

FIG. 2 is a flowchart illustrating an operation procedure of displaying the operation screen and selecting an operation button included therein.

After a display image created by the display image creator 32 is displayed on the display device 20 (step 100), the contact position capturer 34 determines whether or not a specific operation button (specific button) is included in the screen being displayed (step 102). In the case where any specific button is not included ("NO" in step 102), the contact position capturer 34 determines whether or not an interrupt signal has been output from the interrupt generator 22 (step 104). In the case where the interrupt signal is not output ("NO" in step 104), the process returns to step 102 to repeat the determination regarding the presence or absence of a specific button on the screen being displayed.

In the case where an interrupt signal has been output ("YES" in step 104, the contact position capturer 34 transmits an instruction to the contact position specifier 24 to specify the contact position of the indicator, and captures the specified contact position (step 106).

Next, the operation determiner 36 specifies an operation button corresponding to the contact position of the indicator captured by the contact position capturer 34 (step 108). In the case where the indicator points to an operation button, the pointed-to operation button is specified. Furthermore, in the case where the contact position of the indicator is in an area other than the operation buttons, it is determined that there is no selectable operation button at the pointed-to position. After the step of specifying the operation button is completed, the process returns to step 102, and the determination regarding the presence or absence of a specific button on the screen being displayed is repeated.

In the case where a specific button is included in the screen being displayed ("YES" in step 102), the contact position capturer 34 determines whether or not an interrupt signal has been output from the interrupt generator 22 (step 112). In the case where the interrupt signal is output ("YES" in step 112), the process proceeds to step 106, and after the contact position is specified and captured (step 106) and the operation content is specified (step 108), the process returns to step 102 and the determination of the presence or absence of the specific button on the screen being displayed is repeated.

In the case where an interrupt signal is not output ("NO" in step 112), the contact position capturer 34 determines whether or not a predetermined length of time has elapsed (step 114). The measurement of a predetermined length of time starts at a point of time when the display of the operation screen is started. After that, the measurement starts at a point of time when a predetermined length of time has elapsed. In the case where a predetermined length of time has not elapsed ("NO" in step 114), the process proceeds to step 112, where it is determined whether or not an interrupt signal has been output. In the case where the predetermined length of time has elapsed ("YES" in step 114), the process proceeds to step 106. After the contact position is specified and captured (step 106) and the operation content is specified (step 108), the process returns to step 102 and the determination of the presence or absence of the specific button on the screen being displayed is repeated. However, in most cases where the predetermined length of time has elapsed, the indicator is not in contact with the touch panel 12, and it is therefore determined that the indicator is not in contact in step 108 of specifying an operation content.

As described above, in the in-vehicle device 100 of the present embodiment, in the case where the specific button (specific operation area) is included in the display screen, the contact position of the indicator is periodically specified every time a predetermined length of time elapses; therefore, even in the case where the interrupt signal is not output due to an abnormality in the interrupt occurrence, it is still possible to specify the contact position corresponding to the specific button.

Furthermore, since the contact position with respect to the specific button is not only periodically specified but also specified in response to occurrence of an interrupt, during a normal state (when the interrupt signal is normally output), the contact position can be detected upon the user's touch of the specific button with the indicator, and the contact position of the indicator with respect to the specific button can be reliably detected by the periodic detection operation even in the absence of an interrupt at the time of occurrence of the abnormality.

The present invention is not limited to the above-described embodiment, and various modifications can be made within the scope of the present invention. In the above-described embodiment, in the case where a specific button is included in the display screen, specifying a contact position in response to occurrence of an interrupt and specifying a contact position every time a predetermined time elapse are performed in parallel; however, specifying a contact position in response to an occurrence of an interrupt occurs may be omitted. For example, in the flowchart illustrated in FIG. 2, the determination as to whether or not an interrupt signal has been output in step 112 may be omitted.

In the above-described embodiment, in the case where a specific button is included in the display screen, since specifying the contact position corresponding to an output of an interrupt signal and specifying the contact position by the periodic detection operation are performed in parallel, an output operation failure of an interrupt signal in the interrupt generator 22 may be determined using the results of those specifying operations.

Figure 3:
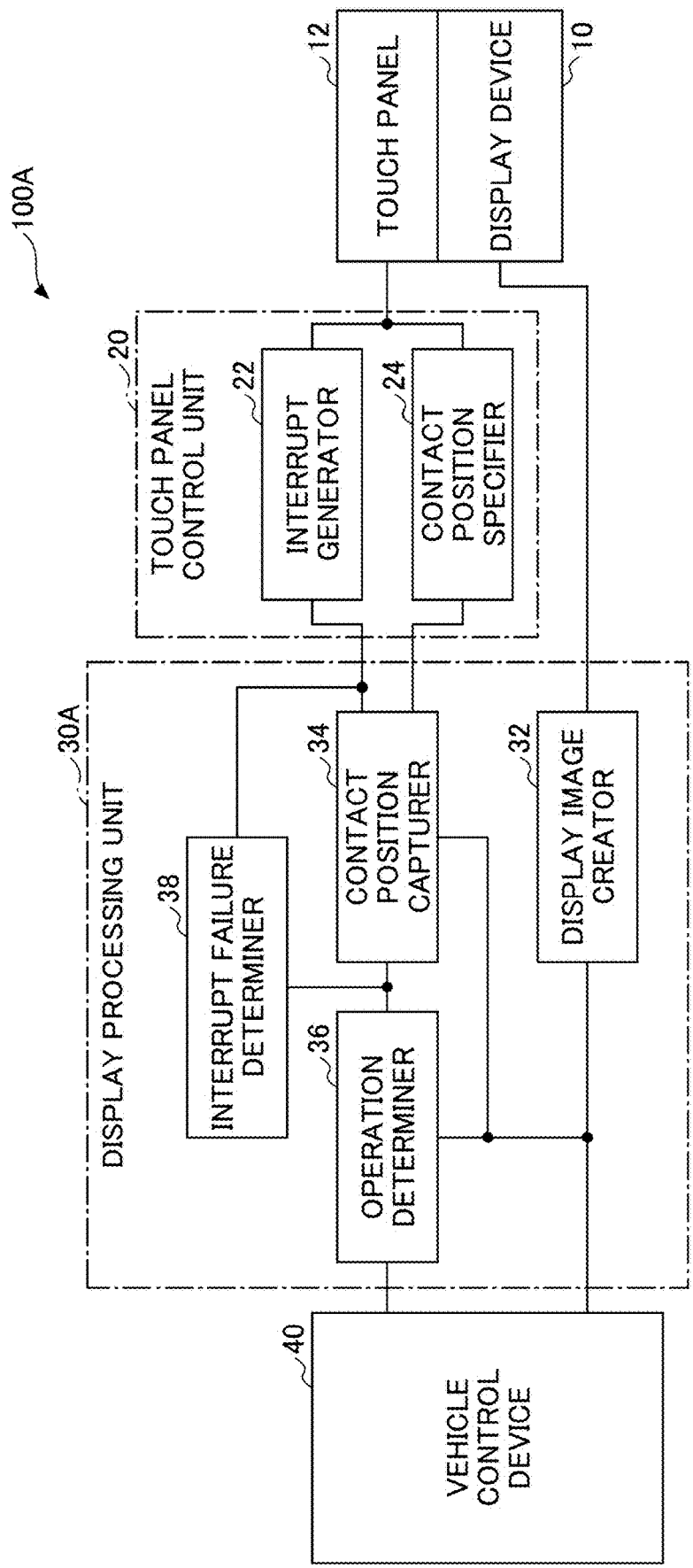
FIG. 3 is a diagram illustrating a configuration of an in-vehicle device of a modified example.

FIG. 3 is a diagram illustrating a configuration of an in-vehicle device of a modified example. The in-vehicle device 100A illustrated in FIG. 3 is different from the in-vehicle device 100 illustrated in FIG. 1 in that the display processing unit 30 is replaced with a display processing unit 30A. The display processing unit 30A differs from the display processing unit 30 in that an interrupt failure determiner 38 is added. The interrupt failure determiner 38 corresponds to an interrupt failure determiner.

Figure 4:
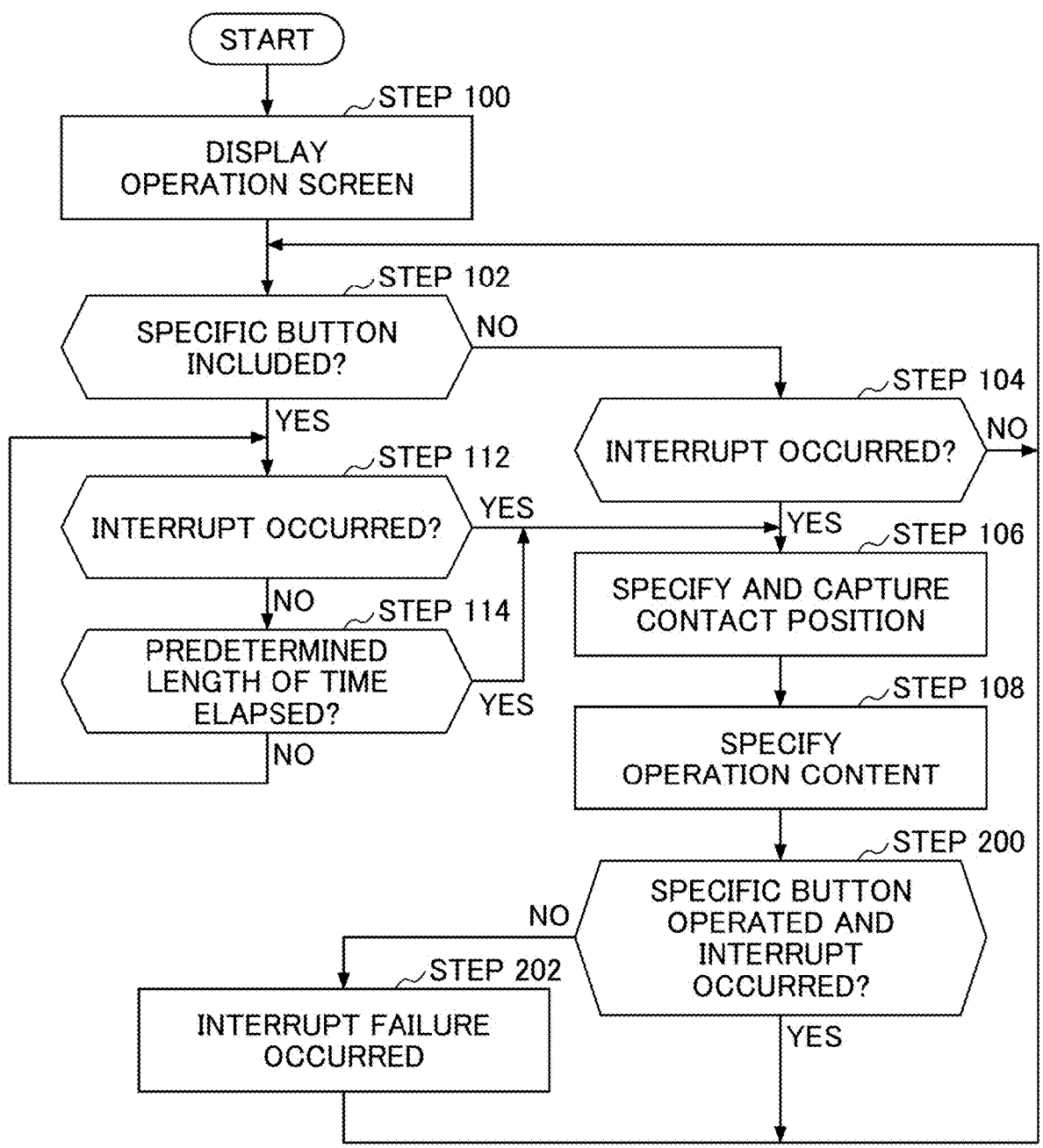
FIG. 4 is a flowchart illustrating an operation procedure of determining an interrupt failure according to a modified example.

FIG. 4 is a flowchart illustrating an operation procedure of determining an interrupt failure according to the modified example. The operation procedure illustrated in FIG. 4 is different from the operation procedure illustrated in FIG. 2 in that step 200 and step 202 are added after the operation of step 108.

After the operation button corresponding to the contact position of the indicator is specified (step 108), the interrupt failure determiner 38 determines whether or not the contact position of the specified button is specified in response to the output of the interrupt signal in the case where the specified operation button is the specified button (step 200). In the case where the interrupt generator 22 is operating normally, an interrupt signal should be output in response to the indicator's contact with the specific button (in the case where an interrupt signal is output, a positive determination is made in the determination of step 200, and the process returns to step 102 to determine whether or not there is a specific button on the screen being displayed); therefore, it is possible to check whether or not there is an operation failure in the interrupt generator 22, given that an interrupt signal has not been yet output at this point of time. In the case where an interrupt signal is not output, a negative determination is made in the determination of step 200, and the interrupt failure determiner 38 determines that an interrupt failure has occurred (step 202). Thereafter, the process returns to step 102, and the determination of the presence or absence of the specific button on the screen being displayed is repeated. In an event of an operation failure of an interrupt signal output, it is desirable to notify the user of the failure by a warning display or a warning sound output. Furthermore, in an event of an operation failure, specifying the contact positions of all the operation buttons thereafter may be performed at a predetermined cycle. It is thus possible to resume the position detection of the portions which cannot be detected because the interrupt signal is not output (the operation buttons other than the specific button).

As described above, according to the present invention, since a contact position is periodically specified for a specific operation area, the contact position can be detected regardless of the presence or absence of abnormality in the generation of an interrupt.

What is claimed is:

1. A position detection device, comprising:
a touch panel disposed on a display screen of a display device;
a touch panel controller configured to
output an interrupt signal in response to a detection of a contact of an indicator with respect to the touch panel,
specify, in a case of no displaying of a specific operation area on the display screen, a contact position of the indicator using the touch panel in response to an output of the interrupt signal, or specify, in a case of displaying of the specific operation area on the display screen, a contact position of the indicator using the touch panel at a predetermined cycle, and
perform specifying, in the case of displaying of the specific operation area on the display screen, the contact position of the indicator using the touch panel at the predetermined cycle in conjunction with specifying the contact position of the indicator using the touch panel in response to an output of the interrupt signal; and
a display controller configured to determine, in a case of no output of the interrupt signal, an operation failure of the touch panel controller in response to a detection of a contact of an indicator with respect to the specific operation area through periodic specifying of a contact position performed by the touch panel controller.

2. The position detection device according to claim 1, wherein
the touch panel controller is configured to specify, in response to the display controller determining an operation failure of the touch panel controller, a contact position at the predetermined cycle after the operation failure determination regardless of whether or not the specific operation area is displayed.

* * * * *